United States Patent [19]
Coupland

[11] 3,943,831
[45] Mar. 16, 1976

[54] SPRING BRAKE UNITS AND DRAINAGE MEANS THEREFOR

[75] Inventor: Ralph Coupland, Lincoln, England

[73] Assignee: Clayton Dewandre Company Limited, Lincoln, England

[22] Filed: Dec. 5, 1974

[21] Appl. No.: 529,959

[52] U.S. Cl. .................. 92/86; 92/63; 92/130 A; 188/170
[51] Int. Cl.² ................................... F01B 31/18
[58] Field of Search ....... 188/170; 192/91 R; 92/62, 92/63, 64, 130 A

[56] References Cited
UNITED STATES PATENTS

| | | | |
|---|---|---|---|
| 3,181,433 | 5/1965 | Cruse | 92/63 X |
| 3,495,503 | 2/1970 | Gummer et al. | 92/63 |
| 3,630,093 | 12/1971 | Morse et al. | 188/170 X |
| R25,669 | 10/1964 | Leighton et al. | 92/63 |

Primary Examiner—George E. A. Halvosa
Attorney, Agent, or Firm—Norris & Bateman

[57] ABSTRACT

A spring brake unit for use in a vehicle braking system comprises a housing, a piston movable therein and connected to a brake or brake linkage, a spring interposed between the piston and a detachable end wall on the housing and urging the piston in a direction to apply the brakes fluid under pressure being introduced to the housing in a controlled manner to hold the piston in brake-off position, and the housing and/or detachable end wall being formed to define one or more drainage channels opening into a gaiter which bridges the joint between them and which includes a drain outlet.

6 Claims, 1 Drawing Figure

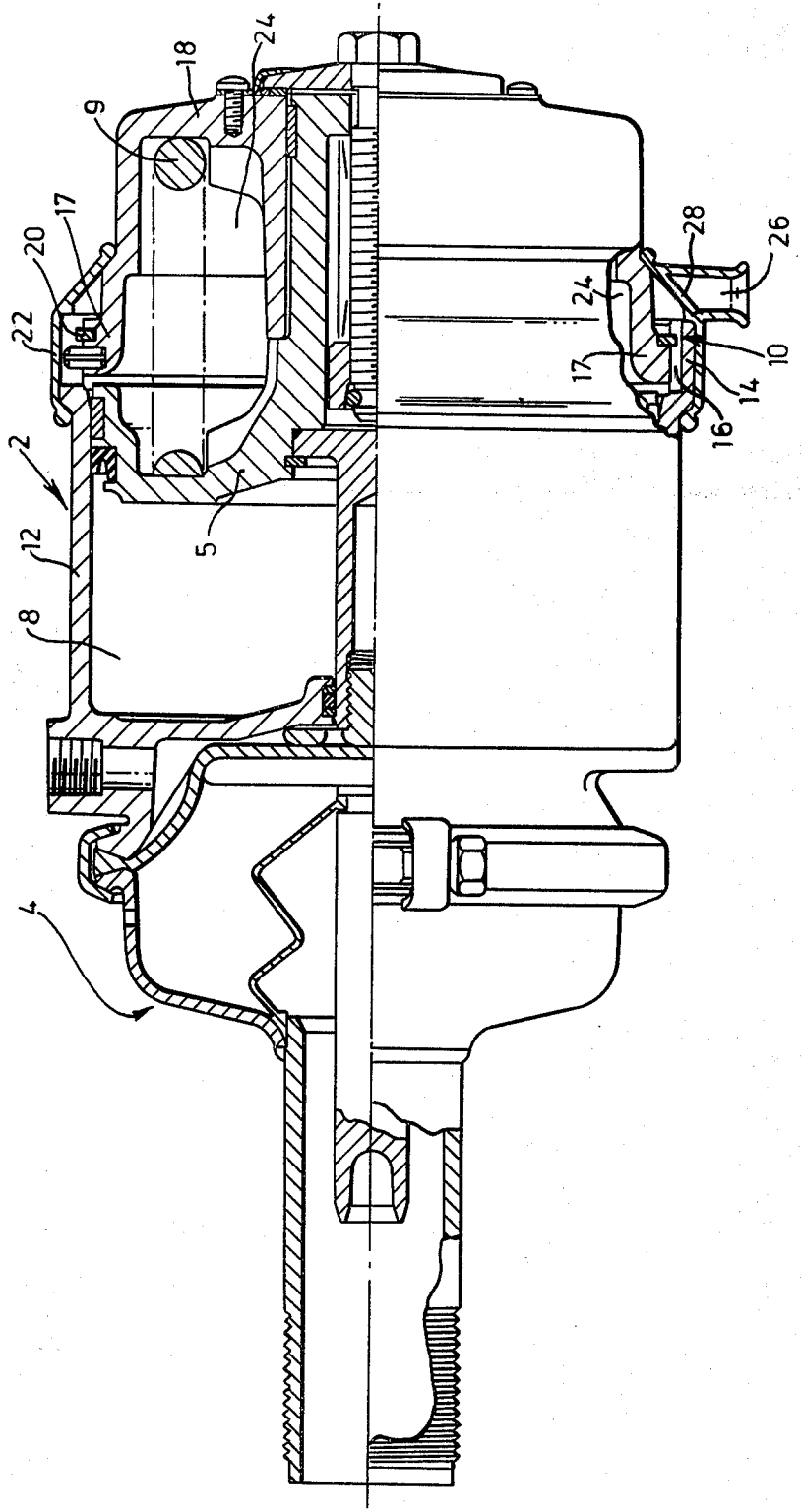

SPRING BRAKE UNITS AND DRAINAGE MEANS THEREFOR

This invention relates to spring brake units for use in vehicle braking systems. Such brake units normally comprise a cylindrical housing, a piston movable axially therein and having operative connection with the brake or brake linkage, a loading spring operating to urge the piston in a direction to apply the brakes and means for introducing pressure fluid to the housing in such manner that the piston is normally held in an inoperative position but, on a reduction or failure of the supply of pressure fluid, said wall moves under the action of its loading spring to apply the brakes. Such units are sometimes constructed as separate entities although they are often combined with a fluid pressure-actuated brake motor to form an assembly having a common output rod.

In spring brakes as above described the loading spring is often located between the piston and a detachable housing end wall which is of dished formation and is retained within the open end of the housing by a spring circlip or equivalent means. It has been found that in such units, particularly where there is provision for breathing, moisture tends to collect in the spring chamber defined by said movable wall and said end wall and such moisture can have a deleterious effect on the smooth working of the unit.

It is an object of the present invention to provide for such a unit a housing construction which overcomes this defect.

According to the invention a spring brake unit for use in vehicle braking systems comprises a housing, a piston for direct or indirect connection, in use, with the brake or brake linkage and movable axially within the housing, under the action of a spring located between one side of the movable piston and a detachable housing and wall, to apply the brakes upon reduction or failure of supply of pressure fluid to the other side of the piston, wherein either or both of the housing and the detachable end wall are so formed as to define one or more drainage ports, the joint between the two parts of the housing being bridged by a gaiter into which the port or ports open and which includes a drain outlet.

In one embodiment, the detachable end wall fits within an enlarged rim portion on the housing and a series of axially extending slots are formed around the inner face of the rim portion so that the rim portion and end wall together define the drainage ports.

Preferably, the drain outlet comprises a radially extending channel communicating with the interior of the gaiter and a flap which normally closes the channel, but is arranged to yield to permit drainage. In a preferred embodiment, the flap is formed from resilient material and is integral with the gaiter.

An embodiment of the invention will now be described by way of example with reference to the accompanying drawing which is a cross-section of a spring brake unit 2 according to this invention in combination with a fluid pressure-actuated brake motor 4.

A piston 5 is slidable within an open ended housing and defines a chamber 8 to which high pressure fluid is introduced to hold the piston 5 in an inoperative position against the action of a spring 9.

The open end 10 of the cylindrical housing or body 12 comprises an enlarged rim portion 14 in the inner face of which is formed a series of eight, axially-extending equally-spaced slots 16, a thickened rim 17 on the detachable end plate 18 being retained within this enlarged portion by a spring circlip 20 received in an annular groove formed in the wall of the housing body 12. The slots 16 permit the spring chamber to breathe whilst at the same time allowing any moisture forming in the spring chamber 24 to drain to the exterior of the end wall. Embracing the joint between the body 12 and the end plate 18 is a flexible annular gaiter 22 of synthetic or natural rubber or a synthetic plastics material, resiliently held in place on the unit and into which moisture drains from the spring chamber 24. The gaiter 22 is provided at one point with a radially-extending drainage channel 26. In use, the gaiter is positioned on the unit as shown in the drawing, such that the drainage channel 26 is at the lowest point and extends downwardly. A resilient flap 28, integral with the gaiter, is provided at the inner end of the drainage channel 26 which yields to permit drainage moisture to escape, but which normally closes the channel to prevent the entry of dust or other foreign matter into the gaiter and thus into the unit.

We claim:

1. A spring brake unit for a vehicle braking system comprising a housing member having a detachable end wall member providing an annular joint between said members, a piston axially movable within the housing member and defining a spring chamber between the piston and end wall and a fluid pressure chamber on the opposite side, means on the piston extending through said fluid pressure chamber for connecting said piston to the vehicle brakes, spring means in said spring chamber axially extending between said piston and said end wall, said spring means being compressed and held in energized condition by said piston when there is a predetermined pressure in said fluid pressure chamber and being adapted to expand and displace said piston in the brake applying direction when there is less than said predetermined pressure in said fluid pressure chamber, means providing a gaiter circuferentially surrounding and bridging said joint, means defining at least one moisture drainage port in at least one of said members opening into the gaiter at said joint, and a normally closed drain outlet in said gaiter.

2. A unit according to claim 1, wherein the detachable end wall member fits within an enlarged rim portion on the housing member and wherein a series of axially extending slots are formed around the inner face of the rim portion so that the rim portion and end wall member together define the drainage ports.

3. A unit according to claim 1, wherein the drain outlet comprises a radially extending channel communicating with the interior of the gaiter and a flap which normally closes the channel to block entry of foreign matter but is arranged to yield to permit drainage of moisture from the spring chamber.

4. A unit according to claim 3, wherein the flap is formed from resilient material and is integral with the gaiter.

5. A unit according to claim 1, wherein the gaiter is formed from rubber or a synthetic plastics material.

6. A unit according to claim 1, wherein said gaiter is an integral unit of resilient material resiliently held in place on said members.

* * * * *